Nov. 24, 1964        H. T. HALL        3,158,442
METHOD OF MAKING HIGH COMPRESSIVE STRENGTH SILICON
CARBIDE AND THE PRODUCT THEREOF
Filed Sept. 25, 1961

INVENTOR.
HOWARD T. HALL
BY
ATTORNEYS

United States Patent Office 3,158,442
Patented Nov. 24, 1964

3,158,442
METHOD OF MAKING HIGH COMPRESSIVE STRENGTH SILICON CARBIDE AND THE PRODUCT THEREOF
Howard T. Hall, Provo, Utah, assignor to Research Corporation, New York, N.Y., a corporation of New York
Filed Sept. 25, 1961, Ser. No. 140,506
4 Claims. (Cl. 23—208)

This invention relates to a new form of silicon carbide having novel and useful properties and to a method of making the material.

It is a particular object of the present invention to provide an at least partially resolidified fine-grained silicon carbide having compressive strengths substantially greater than the maximum compressive strengths of presently known hot-pressed silicon carbides.

It is a further object to provide a new and improved extremely hard material suitable for utilization in cutting and abrading tools which are harder and tougher than conventional aluminum oxide tools and have greater shock resistance.

These and other objects and advantages are provided by a new dense fine-grained at least partially resolidified silicon carbide having a silver-gray metallic luster and a compressive strength above 150,000 p.s.i. and by a method of making a fine-grained, dense, hard material comprising subjecting silicon carbide to a temperature of at least 3,000° C. and a pressure of at least 40,000 pounds per square inch for at least about 30 seconds.

Figure 1:
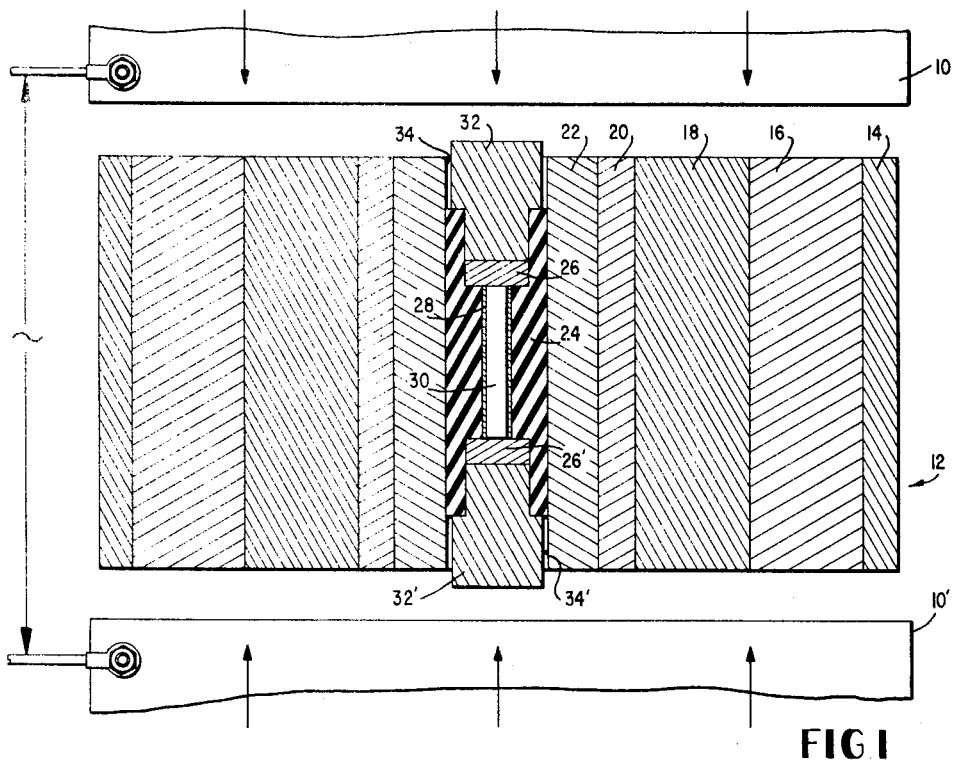
Figure 2:
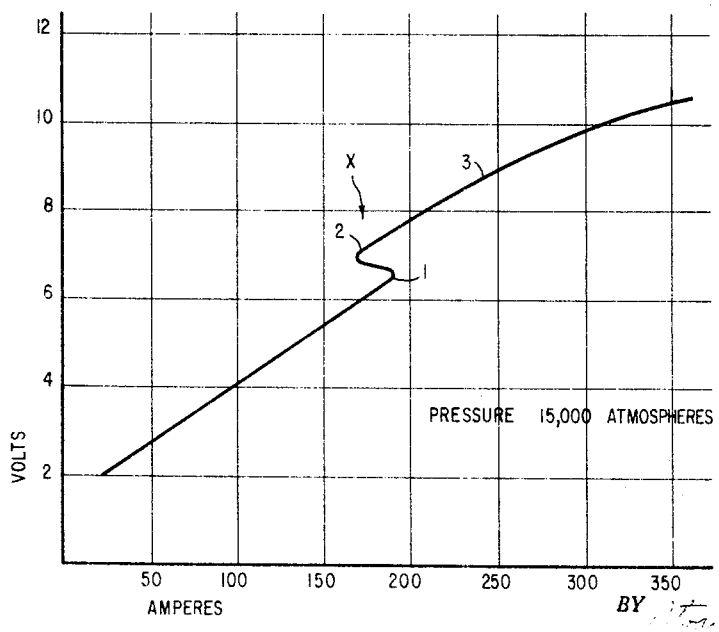

The invention will be more particularly described with reference to the accompanying drawings wherein:

FIG. 1 is a fragmentary sectional view of the apparatus suitable for carrying out the process of the invention; and FIG. 2 is a typical voltage-current curve for silicon carbide in apparatus of the type shown in FIG. 1.

Silicon carbide, which sublimes at normal ambient pressures at about 2,200° C., has been found to show indications of melting when simultaneously subjected to moderately high pressures of at least about 40,000 p.s.i. at a temperature of at least about 3,000° C. for a length of time of at least about 30 seconds. If, following such a heating, the material is cooled rapidly and the pressure released, the resulting product is an extremely hard, dense and fine-grained material having a silver-gray metallic luster.

The fused or resolidified silicon carbide exhibits compressive strengths from about 150,000 p.s.i. up to about 700,000 p.s.i. as compared to hot-pressed sintered mixtures of aluminum powder and silicon carbide which has maximum compressive strengths of about 20,000 p.s.i.

The new material is produced by subjecting commercial silicon carbide to temperatures between 3,000° C. and 10,000° C. simultaneously with pressures between 40,000 p.s.i. and 1,500,000 p.s.i. for a length of time between 30 seconds and 5 minutes and then rapidly cooling the heated material prior to releasing the pressure.

In making the new dense material pressures of at least 100,000 p.s.i. at temperatures of 3,500–4,000° C. are preferred although good quality resolidified material can be produced at a pressure of about 40,000 p.s.i. at about 3,000° C.

X-ray diffraction analysis of the material suggests that the new material has undergone a simplification in the normal silicon carbide diffraction pattern and that the new material has its atoms arranged in a cubic structure whereas the atoms of normal silicon carbide are arranged in a hexagonal structure.

The process of the invention can be carried out in any high pressure, high temperature apparatus that can simultaneously achieve pressures and temperatures of at least 40,000 p.s.i. and 3,000° C. and which may use a solid or liquid material to transmit the pressure to the heated sample.

Satisfactory results may be obtained in a tetrahedral anvil type press employing a pyrophyllite pressure transmitting sample holder as disclosed in my U.S. Patent No. 2,918,699, issued December 29, 1959.

In FIG. 1 another form of high temperature, moderately high pressure bomb suitable for carrying out the process of the invention is illustrated.

Referring to FIG. 1, 10 and 10' are movable platens or piston ends of conventional hydraulic rams and 12 generally designates a high temperature, high pressure bomb. The bomb 12 includes a safety ring 14, steel binding rings 16 and 18, a steel shin or wedge 20 and a sintered tungsten carbide liner 22.

Within the central opening in the carbide liner 22 is mounted a pyrophyllite gasket 24 having a central bore adapted to receive a carbon tube 28 containing the silicon carbide sample 30. The ends of the sample tube are sealed by carbon end discs 26 and 26', the outer surfaces of which are engaged by the pair of stepped tungsten carbide or air hardened die steel pistons 32 and 32'.

The largest diameter of the pistons 32 and 32' is about 1/32 inch smaller than the inside diameter of the carbide liner 22 so that electrical heating current can be brought in through these pistons to heat the sample without shorting through the carbide liner 22.

Pressure is generated by forcing the pistons 32 and 32' together with the ram pistons 10 and 10'.

As the pistons 32 and 32' are forced together pyrophyllite squeezes a short distance into the small annular spaces 34 and 34' between the pistons and the liner 22.

With a device of the type shown in FIG. 1 simultaneous temperatures and pressures of 15,000 atmospheres and 10,000° C. can be obtained. Where higher pressures were desired a tetrahedral anvil press may be used.

Because it is not possible today to accurately measure high temperatures within a confined space, it is difficult to specify accurately the temperatures required to fuse or soften silicon carbide to form the new product. However, I have found that when a specimen is heated by passing an electrical current through the silicon carbide contained in a carbon sleeve, there is a very definite change in the current-voltage characteristics of the system as the heating power is increased.

Referring to FIG. 2, there is shown a typical heating curve obtained on a plot of voltage across a sample of silicon carbide against the current through the sample.

It has been found that the new product formation will occur at power inputs at least beyond the point X where the "dog-leg" formation occurs on the plot. It is believed that the silicon carbide begins to melt at the region of the dog-leg.

*Example*

At a pressure of 15,000 atmospheres the voltage across the cell as a function of amperes through the cell appears as is shown in FIG. 2. The temperature at point X is in the neighborhood of 3,200° C. Samples of green silicon carbide were heated to a maximum temperature in the various regions marked by the numerals 1, 2 and 3 along the curve as shown in FIG. 2. The temperature was increased to the maximum during a period of approximately 4 minutes and held at the maximum temperature for up to 1 minute. After holding at the maximum temperature the electrical power was abruptly disconnected thus quenching the sample. (Cooling time is just a few seconds.) The silicon carbide sample was then removed and a fractured surface was examined under the microscope. The silicon carbide quenched from region 1 is compact and gray in color. Material quenched from region 2 is more compact than that quenched from region 1 and is lighter in color. Materials quenched from region 3 has a higher metallic sheen than those quenched from lower temperatures.

Several silicon carbide samples quenched from region 1 were fashioned into cylinders of approximately ¼ inch diameter and 5/16 inch long, by grinding with a diamond wheel. These samples were then subjected to compressive tests. About a half dozen specimens failed in the neighborhood of 300,000 p.s.i. load. One specimen withstood 693,000 p.s.i. before failure and another failed at 575,000 p.s.i. Ordinary commercial hot pressed silicon carbide has a compressive strength in the neighborhood of 20,000 p.s.i. Two of the above specimens, therefore, showed a phenomenal increase in compressive strength over commercial material of a factor of about 30. Some of these fused silicon carbide specimens were fashioned into lathe cutting tools and given qualitative tests in comparison with some standard cemented tungsten carbide cutting tools. In these tests the silicon carbide tools kept a better edge than the tungsten carbide tools and also were less fragile with respect to breaking under interrupted cutting conditions.

I claim:
1. A dense, fine-grained, at least partially resolidified silicon carbide having a compressive strength of at least 150,000 pounds per square inch.
2. A dense, fine-grained, at least partially resolidified silicon carbide having a compressive strength of from about 300,000 to about 700,000 pounds per square inch.
3. A method of making high compressive strength silicon carbide comprising subjecting low-compressive strength silicon carbide simultaneously to a temperature of at least 3,000° C. and a pressure of at least 40,000 pounds per square inch for at least thirty seconds.
4. A method of making high compressive strength silicon carbide comprising subjecting low-compressive strength silicon carbide simultaneously to a temperature of from about 3,500° C. to about 10,000° C. and a pressure of from about 100,000 to about 1,500,000 pounds per square inch for from about thirty seconds to about five minutes.

References Cited in the file of this patent
UNITED STATES PATENTS

| | | |
|---|---|---|
| 723,631 | Acheson | Mar. 24, 1903 |
| 1,343,976 | Liebmann et al. | June 22, 1920 |
| 2,244,052 | Comstock | June 3, 1941 |

OTHER REFERENCES

Schwarzkopf et al.: Refractory Hard Metals, The Macmillan Co. (1953), p. 413.